Feb. 18, 1936.　　　C. C. WALLACE　　　2,031,438

GLASS JAR AND COVER FOR STORAGE BATTERY CELLS

Filed June 26, 1935

WITNESS:

INVENTOR
Curtis C. Wallace
BY
Augustus B. Stoughton
ATTORNEYS

Patented Feb. 18, 1936

2,031,438

UNITED STATES PATENT OFFICE 2,031,438

GLASS JAR AND COVER FOR STORAGE BATTERY CELLS

Curtis C. Wallace, Philadelphia, Pa., assignor to The Electric Storage Battery Company, Philadelphia, Pa., a corporation of New Jersey Application June 26, 1935, Serial No. 28,432

1 Claim. (Cl. 136—170)

Certain types of storage battery cells are assembled in glass jars with glass covers resting on the upper edges of the jar, the positive and negative plate groups being supported in the cell by suspending them from the cover by means of the respective terminal posts which pass through openings in the cover and which are provided with seal-nuts threaded or otherwise attached to the posts and bearing upon the upper surface of the cover.

It is practically impossible to provide an exact fit between the upper surface of the jar wall and the under side of the cover which bears upon this wall without incurring prohibitive expense for grinding these surfaces. As a result, the cover usually rests upon the jar wall at three points located by chance anywhere around the periphery of the jar wall, depending upon the chance location of irregularities in the surfaces. These accidental points of contact are quite frequently so located as to bring unnecessarily severe strains on the cover. For example, they may be located at points quite remote from the points where the weight of the plate groups is supported from the cover, giving these weights an unnecessarily long leverage for developing strains in the cover.

One of the principal objects of my invention is to locate the points of contact between the top of the jar wall and the under side of the cover at definite locations with respect to the weight applied to the cover, so as to bring the supporting points as close as possible to the points where the weight is applied. I accomplish this by providing definitely located, raised pads on one of the confronting surfaces of the cover and jar to insure definite points of contact between the top of the jar wall and the cover at the desired locations instead of leaving this to chance.

My invention will be more clearly understood by referring to the following description in connection with the accompanying drawing forming part hereof and in which.

Figure 1:
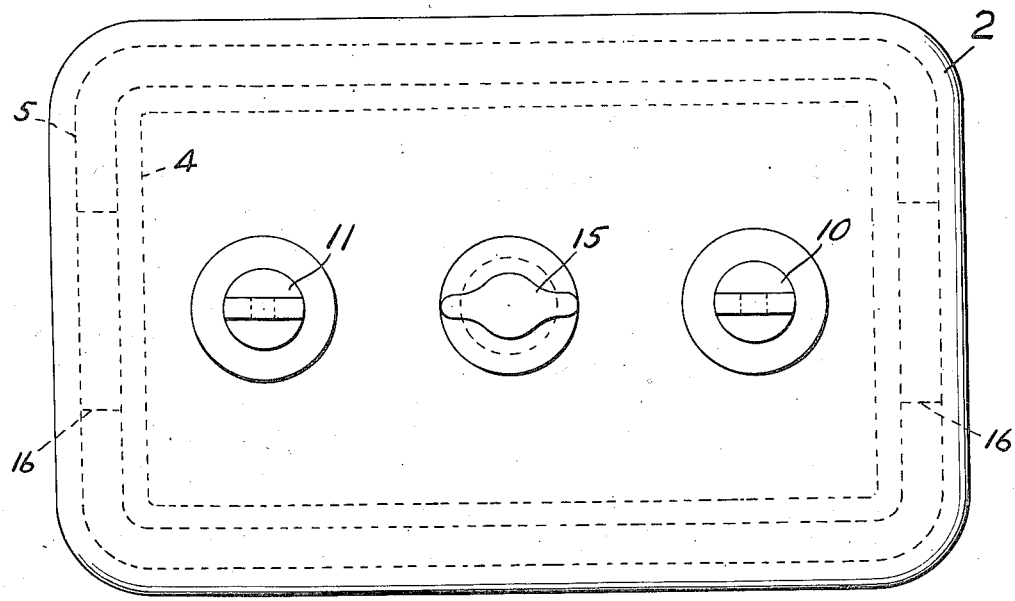
Fig. 1 is a plan view of a cover of a storage battery cell embodying features of my invention.
Figure 2:
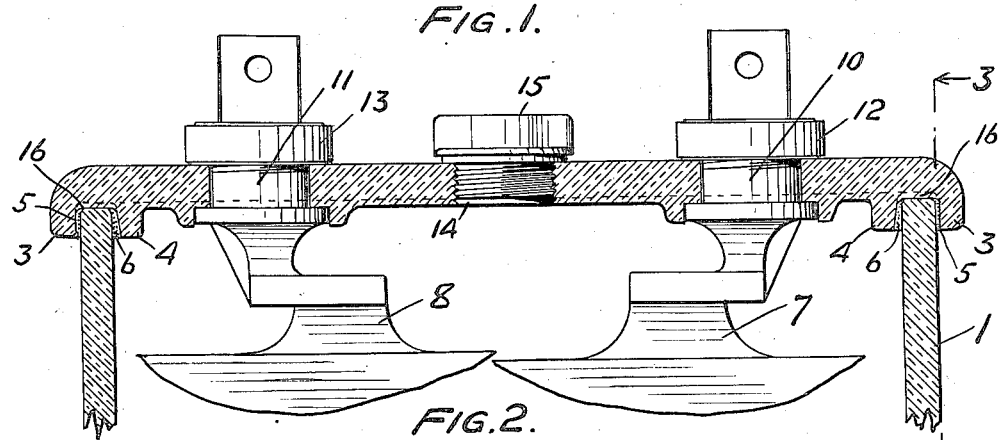
Fig. 2 is a central sectional elevation of the upper part of the cell.
Figure 3:
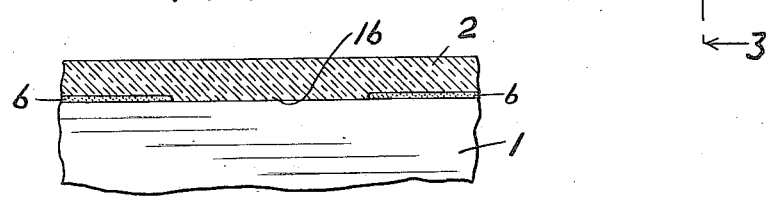
Fig. 3 is a vertical section through a portion of the end wall and cover on line 3—3 of Fig. 2.

In the drawing, 1 is the wall of the glass jar upon the upper edge of which rests the cover 2. The cover is provided on its under side with depending peripheral lips 3 and 4, defining between them a groove 5 which receives the upper edge of the jar wall. Within the groove 5, between the jar wall and the lips of the cover, is located sealing compound 6.

Within the cell are positive and negative plate groups 7 and 8, respectively provided with terminal posts 10 and 11 passing through corresponding openings in the cover. Seal-nuts 12 and 13 are threaded on the terminal posts above the cover and support the weight of the plate groups from the cover. In the middle of the cover is shown a vent opening 14 into which is fitted a suitable vent cap 15.

In order to locate the points where the cover bears upon the top of the jar wall as close as possible to the points where the plate groups are supported, I have shown in the drawing pads 16 raised from the bottom surface of the groove 5 and located respectively at each end of the cover adjacent to the terminal posts 10 and 11, respectively. These pads are of a height just sufficient to insure that the weight of the cover will bear on the top of the jar wall at these points regardless of slight irregularities in the upper surface of the jar wall or the under surface of the cover. It will be seen therefore that I have provided for supporting the cover from the jar wall at points as near as possible to the points from which the weight of the plate groups is suspended, thus producing minimum stress on the cover due to these weights.

I do not intend to be limited save as the scope of the prior art and of the attached claim may require.

I claim:—

In a storage battery, the combination of, a glass jar and a glass cover from which plate structures are suspended in the jar, with raised glass pads interposed between the under face of the cover and the top of the wall of the jar and arranged transversely of a line passing through both points of application of the weight of the plate structures to the glass cover to bring the supporting point of the cover as close as possible to the points where the weight of the plate structures is applied.

CURTIS C. WALLACE.